US010884461B2

United States Patent
Lin et al.

(10) Patent No.: US 10,884,461 B2
(45) Date of Patent: Jan. 5, 2021

(54) HINGE MODULE AND ELECTRONIC DEVICE

(71) Applicants: Che-Hsien Lin, Taipei (TW); Che-Hsien Chu, Taipei (TW); Chun-An Shen, Taipei (TW)

(72) Inventors: Che-Hsien Lin, Taipei (TW); Che-Hsien Chu, Taipei (TW); Chun-An Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/378,566

(22) Filed: Apr. 9, 2019

(65) Prior Publication Data

US 2019/0317560 A1 Oct. 17, 2019

Related U.S. Application Data

(60) Provisional application No. 62/656,988, filed on Apr. 13, 2018.

(51) Int. Cl.
*G06F 1/16* (2006.01)
*F16C 11/04* (2006.01)
(Continued)

(52) U.S. Cl.
CPC ............. *G06F 1/1681* (2013.01); *E05D 3/12* (2013.01); *E05D 11/06* (2013.01); *E05D 11/082* (2013.01);
(Continued)

(58) Field of Classification Search
CPC .... G06F 1/1681; G06F 1/1616; G06F 1/1683; E05D 3/12; E05D 11/06; E05D 11/082;
(Continued)

(56) References Cited

U.S. PATENT DOCUMENTS 8,931,141 B2 * 1/2015 Chen ................... H04M 1/022
16/366
8,959,714 B2 * 2/2015 Hsu ...................... G06F 1/1681
16/287

(Continued)

FOREIGN PATENT DOCUMENTS

| CN | 104421325 | 3/2015 |
|---|---|---|
| TW | M509504 | 9/2015 |
| TW | M547816 | 8/2017 |

OTHER PUBLICATIONS

"Office Action of China Counterpart Application", dated Mar. 16, 2020, p. 1-p. 7.
(Continued)

*Primary Examiner* — William L Miller
(74) *Attorney, Agent, or Firm* — JCIPRNET

(57) ABSTRACT

A hinge module includes a housing and at least one carrying assembly. The housing includes two accommodation spaces. The at least one carrying assembly is disposed at the housing and includes a torque element, two rotation shafts and two brackets. The torque element is disposed in one of the accommodation spaces. The two rotation shafts pass through the torque element. The two brackets are respectively connected to the two rotation shafts and located outside the housing. Each bracket is adapted to rotate along with the corresponding rotation shaft and rotate relative to the torque element.

16 Claims, 9 Drawing Sheets

(51) Int. Cl.
*E05D 11/06* (2006.01)
*E05D 11/08* (2006.01)
*E05D 3/12* (2006.01)

(52) U.S. Cl.
CPC ............ *F16C 11/04* (2013.01); *G06F 1/1616* (2013.01); *G06F 1/1683* (2013.01); *E05Y 2201/224* (2013.01); *E05Y 2900/606* (2013.01); *Y10T 16/547* (2015.01)

(58) Field of Classification Search
CPC ............... F16C 11/04; E05Y 2201/224; E05Y 2900/606; Y10T 16/547; Y10T 16/5478; Y10T 16/540255; Y10T 16/5387; H04M 1/022
USPC ............. 16/366, 371, 303, 330; 379/433.13; 455/575.3; 361/679.27
See application file for complete search history.

(56) References Cited

U.S. PATENT DOCUMENTS

| | | | | |
|---|---|---|---|---|
| 8,959,719 | B2* | 2/2015 | Hsu | G06F 1/1618 16/303 |
| 9,104,381 | B2* | 8/2015 | Kuramochi | G06F 1/1681 |
| 9,115,750 | B2* | 8/2015 | Park | E05D 3/122 |
| 9,261,900 | B2* | 2/2016 | Hsu | G06F 1/16 |
| 9,360,090 | B2* | 6/2016 | Hsu | F16H 19/005 |
| 10,401,914 | B2* | 9/2019 | Shang | E05D 5/04 |
| 2013/0135809 | A1* | 5/2013 | Uchiyama | G06F 1/1681 361/679.09 |
| 2013/0322004 | A1* | 12/2013 | Park | F16C 11/04 361/679.27 |
| 2015/0327383 | A1* | 11/2015 | Hsu | G06F 1/1679 16/366 |
| 2015/0378400 | A1* | 12/2015 | Sprenger | G06F 1/1681 361/679.55 |
| 2016/0222707 | A1* | 8/2016 | Chuang | G06F 1/1681 |
| 2017/0351303 | A1* | 12/2017 | Kuramochi | F16C 11/04 |
| 2017/0356226 | A1* | 12/2017 | Maatta | G06F 1/1641 |
| 2019/0138061 | A1* | 5/2019 | Lin | E05D 3/12 |
| 2019/0155344 | A1* | 5/2019 | Lin | G06F 1/1681 |
| 2019/0250675 | A1* | 8/2019 | Lin | E05D 11/0054 |

OTHER PUBLICATIONS

"Office Action of China Counterpart Application", dated Aug. 5, 2020, pp. 1-6.

* cited by examiner

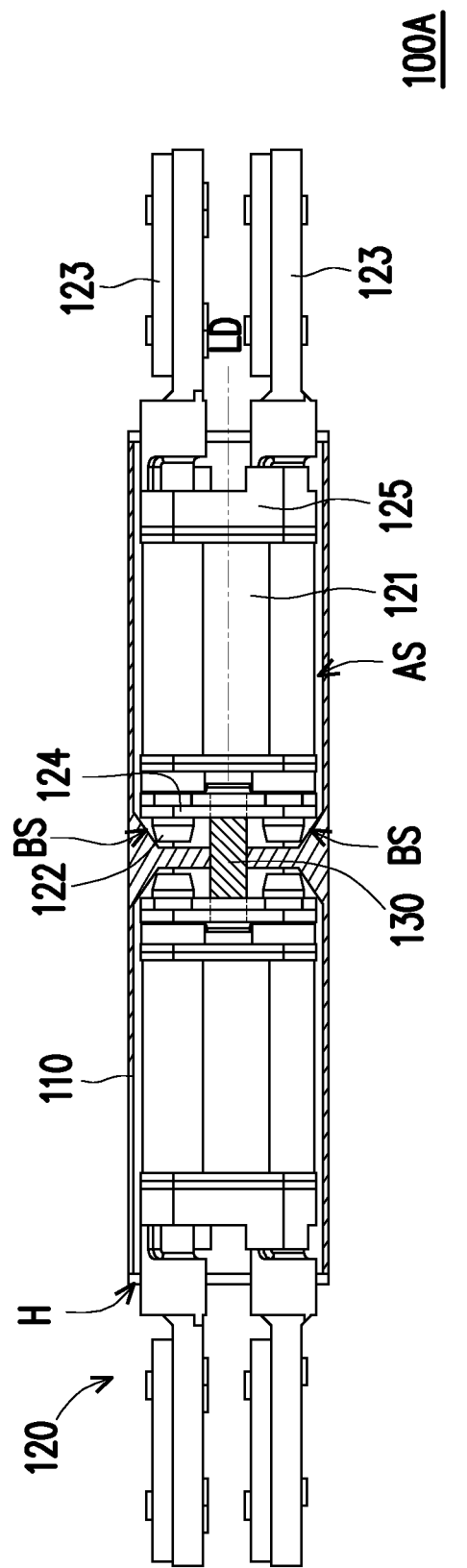
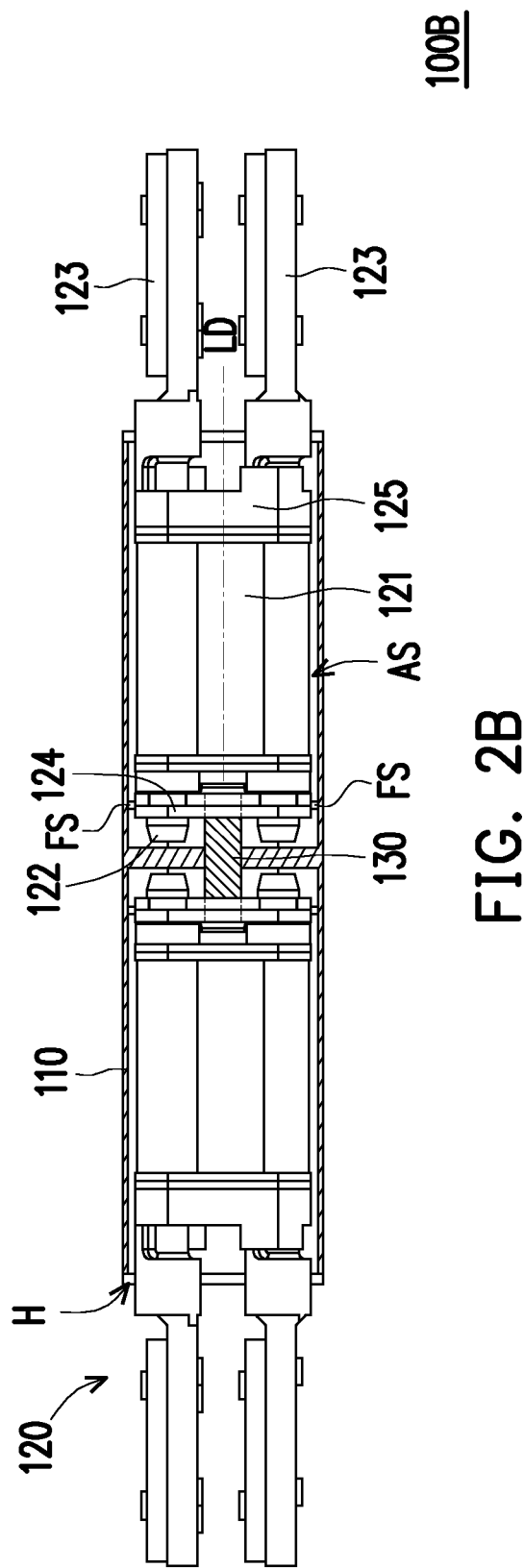
FIG. 2A
FIG. 2B

HINGE MODULE AND ELECTRONIC DEVICE

CROSS REFERENCE TO RELATED APPLICATION

This application claims the priority benefit of U.S. provisional application Ser. No. 62/656,988, filed on Apr. 13, 2018. The entirety of the above-mentioned patent application is hereby incorporated by reference herein and made a part of specification.

FIELD OF THE INVENTION

The application relates to a hinge module and an electronic device and more particularly, to a hinge module capable of adjusting a torque size and an electronic device.

DESCRIPTION OF RELATED ART

Generally, a hinge module is disposed between a system body and a display body of a notebook computer, such that the system body and the display body may be expanded or closed relative to each other through the hinge module. Generally, through a torque of the hinge module, the system body and the display body may be adjusted to any angle. However, the currently available hinge modules have torque values that are unadjustable and thus, are not suitable for being applied to notebook computers for different demands. Thus, the currently available hinge modules have to be operated with the notebook computers of specific specifications and are restricted in manufacturing flexibility.

In addition, the currently available hinge modules are usually configured to connect the bodies at one single side, causing the hinge module to receive an uneven force while the single-side connection mechanism has a large volume, which is unfavorable for the target of notebook computer miniaturization. Accordingly, a hinge module has been developed for improving the defects of uneven received force and large volume and has become a main target for the development.

SUMMARY

The invention provides a hinge module and an electronic device adapted to adjust a torque size and capable of improving the defects of large volume.

A hinge module of the invention includes a housing and at least one carrying assembly. The housing includes two accommodation spaces. The at least one carrying assembly is disposed at the housing and includes a torque element, two rotation shafts and two brackets. The torque element is disposed in one of the accommodation spaces. The two rotation shafts pass through the torque element. The two brackets are respectively connected to the two rotation shafts and located outside the housing. Each bracket is adapted to rotate along with the corresponding rotation shaft and rotate relative to the torque element.

An electronic device of the invention includes two bodies and two hinge modules. The two hinge modules are disposed between the two bodies. Each of the hinge modules includes a housing and at least one carrying assembly. The housing includes two accommodation spaces. The at least one carrying assembly is disposed at the housing and includes a torque element, two rotation shafts and two brackets. The torque element is disposed in one of the accommodation spaces. The two rotation shafts pass through the torque element. The two brackets are respectively connected to the two rotation shafts and located outside the housing, wherein the two bodies are respectively connected to the two brackets. Each of the brackets is adapted to rotate along with the corresponding rotation shaft and rotate relative to the torque element to drive the two bodies to expand or close relative to each other.

To sum up, the hinge module of the invention is adapted to connect the two bodies, and the housing includes the two accommodation spaces which are separated from each other for a carrying assembly to be disposed in each accommodation space. When the hinge module is disposed to include a single carrying assembly, a value of the torque applied between the two bodies by the hinge module is smaller, so as to easily expand or close the two bodies relative to each other, which is applicable to thin and light bodies. When the hinge module is disposed to include two carrying assemblies, the value of the torque applied between the two bodies by the hinge module is larger, which is applicable to thick and heavy bodies. Accordingly, a designer can correspondingly adjust the number of the carrying assemblies required by the hinge module according to characteristics and torque demands of the two bodies.

In addition, the hinge module of the invention can satisfy standard torque demands through the disposition of the two carrying assemblies, as well as achieve an effect of reducing an overall thickness of the hinge module at the same time.

To make the above features and advantages of the invention more comprehensible, embodiments accompanied with drawings are described in detail below.

BRIEF DESCRIPTION OF THE DRAWINGS

FIG. 2A is a schematic cross-sectional diagram illustrating a hinge module according to another embodiment of the invention.

FIG. 2B is a schematic cross-sectional diagram illustrating a hinge module according to another embodiment of the invention.

DESCRIPTION OF EMBODIMENTS

Figure 1A:
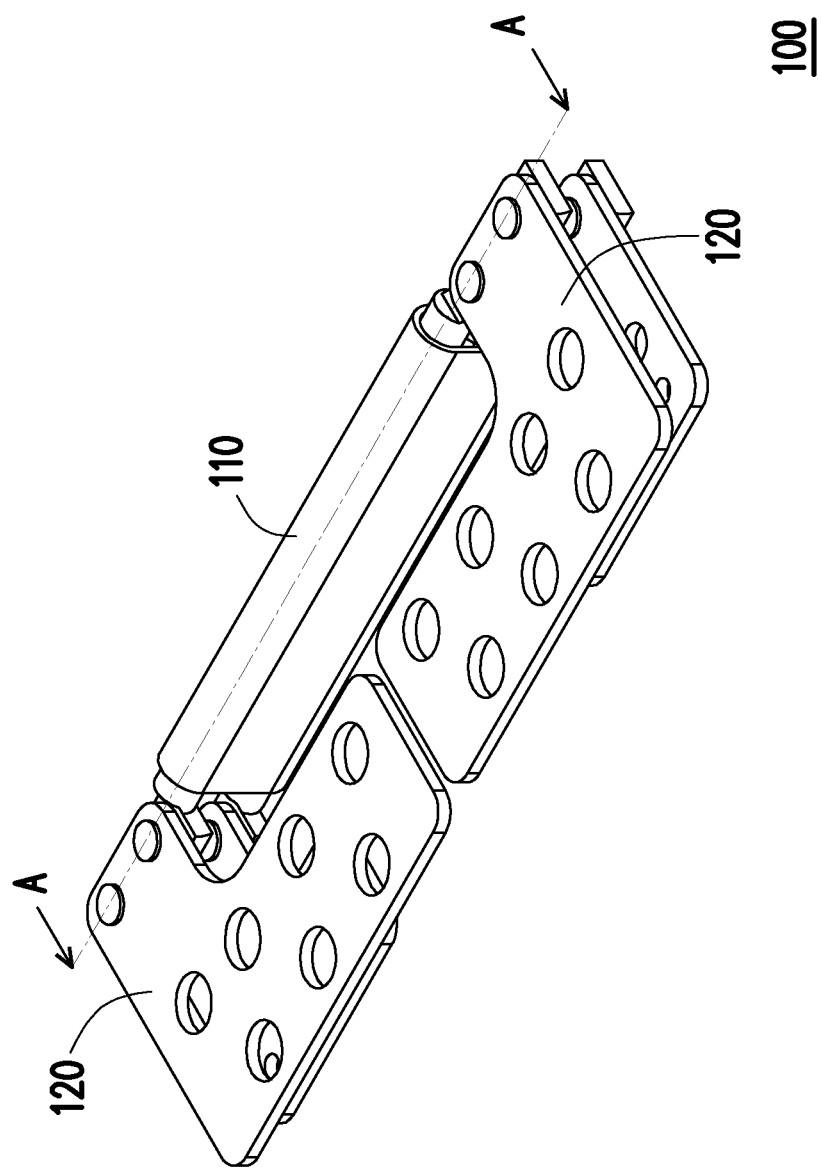
FIG. 1A is a schematic perspective diagram illustrating a hinge module according to an embodiment of the invention.
Figure 1B:
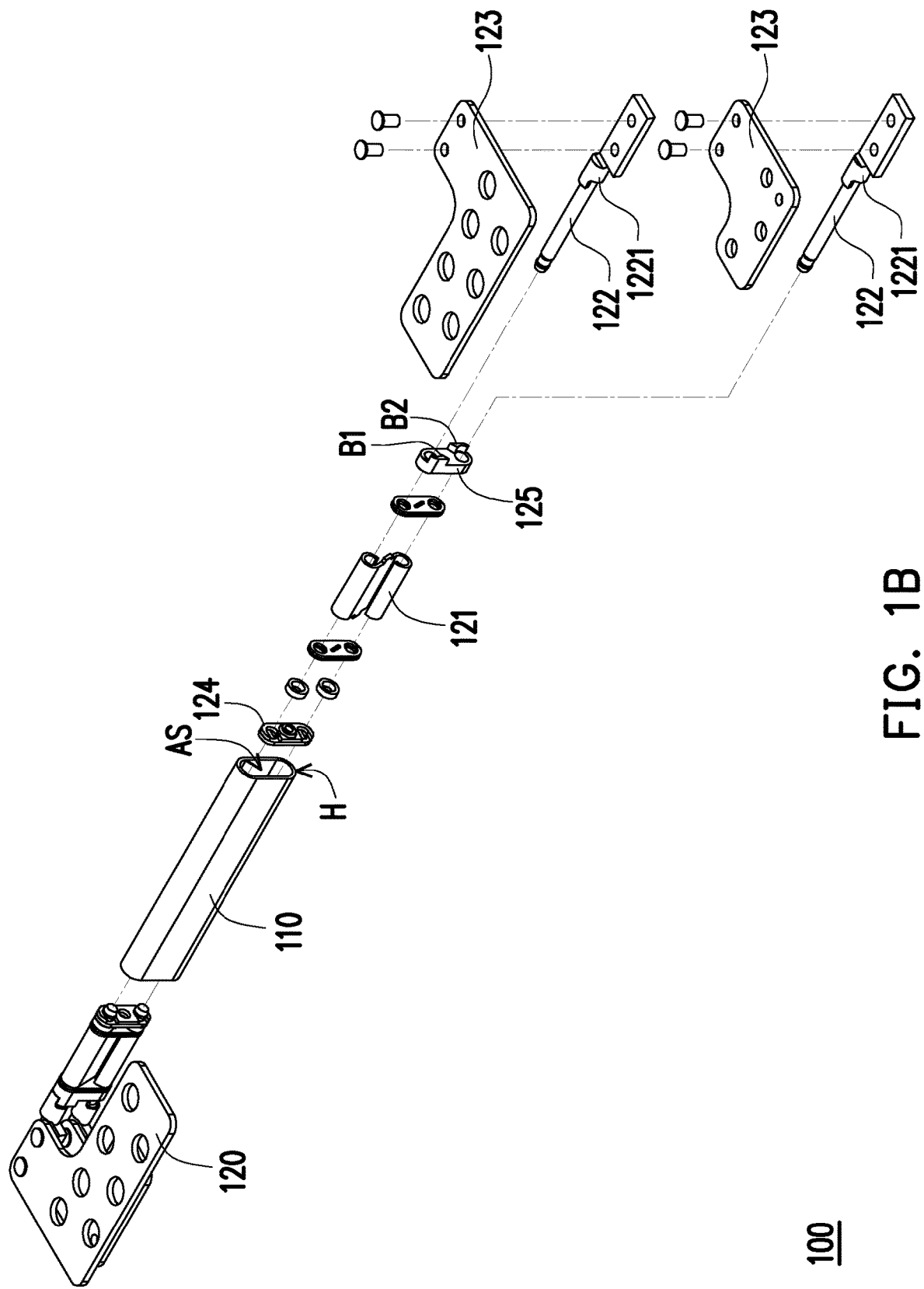
FIG. 1B is a schematic exploded diagram of the components of the hinge module depicted in FIG. 1A.
Figure 1C:
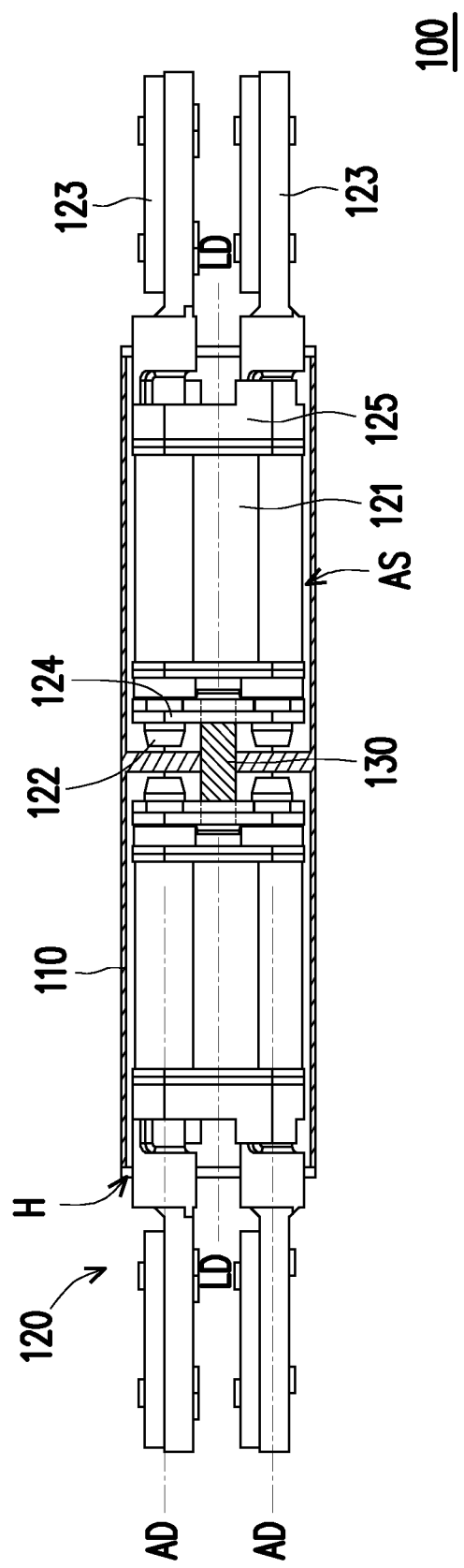
FIG. 1C is a schematic cross-sectional diagram illustrating the hinge module depicted in FIG. 1A along line A-A.

FIG. 1A is a schematic perspective diagram illustrating a hinge module according to an embodiment of the invention. FIG. 1B is a schematic exploded diagram of the components of the hinge module depicted in FIG. 1A. FIG. 1C is a schematic cross-sectional diagram illustrating the hinge module depicted in FIG. 1A along line A-A.

Referring to FIG. 1A to FIG. 1C, a hinge module 100 of the present embodiment includes a housing 110 and at least one carrying assembly 120. The housing 110 includes two accommodation spaces AS. The at least one carrying assembly 120 is, for example, one and disposed at the housing 110. The carrying assembly 120 includes a torque element 121, two rotation shafts 122 and two brackets 123.

The two accommodation spaces AS respectively have openings H which are respectively formed at two opposite sides of the housing 110. The torque element 121 is disposed in one of the accommodation spaces AS. The two rotation shafts 122 pass through the torque element 121 and generates a torque by the rotation shafts 122 frictionally contacting with the to the torque element 121. The two brackets 123 are respectively connected to the two rotation shafts 122 and located outside the housing 110, and the two brackets are, for example, plate structures and used to carry external bodies. Each of the brackets 123 is adapted to rotate along with each corresponding rotation shaft 122 and rotate relative to the torque element 121, such that the two brackets 123 may be expanded or closed relative to each other.

Referring to FIG. 1A, in the present embodiment, the number of the at least one carrying assembly 120 may be two, and the two carrying assemblies 120 are respectively installed in the two corresponding accommodation spaces AS of the housing 110 from the two openings H. In comparison with the scenario that a single carrying assembly 120 is used, a torque value of the hinge module 110 may be double increased.

A positioning pillar 130 may be further included and disposed in the housing 110, and two end portions of the positioning pillar 130 respectively extend into the two accommodation spaces AS. Each of the carrying assemblies 120 further includes a positioning plate 124. The positioning plate 124 is sleeved on a side of the two rotation shafts 122 facing the housing 110 and accommodates one of the end portions of the positioning pillar 130. In addition, the positioning plate 124 of the other carrying assembly 120 accommodates the other one of the end portions of the positioning pillar 130. In addition, an axial direction AD of the positioning pillar 130 is parallel to a length direction LD of the accommodation spaces AS. When the two carrying assemblies 120 respectively penetrate into the two accommodation spaces AS, the two end portions of the positioning pillar 130 pass through the two positioning plates 124 to tightly fit therewith, thereby preventing the two carrying assemblies 120 from swaying when be moved.

Each of the carrying assemblies 120 includes a position-limiting plate 125 sleeved on the two rotation shafts 122 and having a first stopper B1 and a second stopper B2. Each rotation shaft 122 has a bump 1221 connected integrally with the corresponding rotation shaft 122 and the bracket 123. When the two brackets 123 are closed relatively to each other (referring to FIG. 1B, the two brackets 123 are parallel to each other), the two bumps 1221 of the two rotation shafts 122 respectively abut against the first stopper B1 and the second stopper B2. When the two brackets 123 are expanded relatively to each other (i.e., an angle exists between the two brackets 123), the two bumps 1221 of the two rotation shafts 122 respectively depart away from the first stopper B1 and the second stopper B2. Furthermore, the two brackets 123 may be expanded relative to each other with an angle of 180 or 360 degrees.

FIG. 2A is a schematic cross-sectional diagram illustrating a hinge module according to another embodiment of the invention. Referring to FIG. 1C with FIG. 2A, a hinge module 100A illustrated in FIG. 2A is different from the hinge module 100 illustrated in FIG. 1C that an engagement bevel surface BS is formed in each accommodation space AS. The positioning plate 124 of each carrying assembly 120 tightly fits with the corresponding engagement bevel surface BS to prevent the carrying assembly 120 when being moved from departing away from the accommodation space AS along the length direction LD. A size of an inner diameter of each engagement bevel surface BS is gradually increased toward the opening H, thereby gradually guiding the carrying assembly 120 to an engaged state.

FIG. 2B is a schematic cross-sectional diagram illustrating a hinge module according to another embodiment of the invention. Referring to FIG. 1C with FIG. 2B, a hinge module 100B illustrated in FIG. 2B is different from the hinge module 100 illustrated in FIG. 1C in that a fixing structure FS is formed in each accommodation space AS. The positioning plate 124 of each carrying assembly 120 tightly fits with the corresponding fixing structure FS to prevent the carrying assembly 120 when being moved from departing away from the accommodation space AS along the length direction LD. The fixing structure FS is made of, for example, an elastic material. When the carrying assembly 120 enters the accommodation space AS, the fixing structure FS is pushed by the positioning plate 124 and is elastically deformed, such that the fixing structure FS may tightly fit with the outside the positioning plate 124. When the carrying assembly 120 is removed from the accommodation space AS, the fixing structure FS may be elastically recovered to the original state.

Figure 3A:
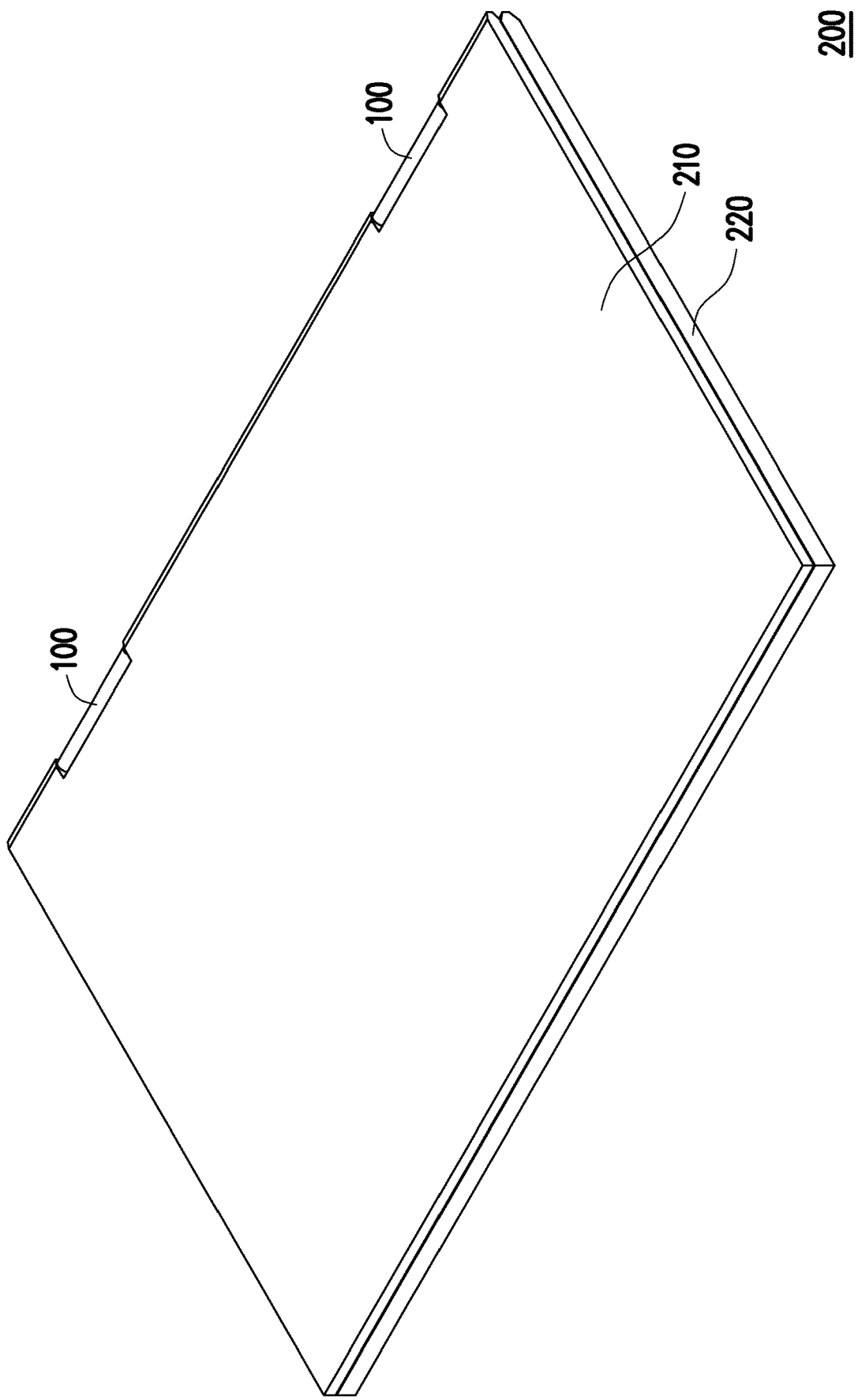
FIG. 3A is a schematic perspective diagram illustrating an electronic device according to an embodiment of the invention.

FIG. 3A is a schematic perspective diagram illustrating an electronic device according to an embodiment of the invention. FIG. 3B through FIG. 3E are schematic structural diagrams illustrating the electronic device depicted in FIG. 2A using two, three, three and four carrying assemblies.

Referring to FIG. 3A and FIG. 1A, an electronic device 200 of the present embodiment includes two bodies 210, 220 and two hinge modules 100. The electronic device 200 is, for example, a notebook computer, a tablet computer or any other similar device. In the present embodiment, the two bodies 210, 220 are respectively a host end and a display end of a notebook computer and respectively disposed on the two hinge modules 100 for the host end and the display end to pivot to each other. When an external force is applied, the host end and the display end may be switched to an expanded state and a closed state.

Referring to FIG. 3A and FIG. 1A, the two hinge modules 100 are disposed between the two bodies 210, 220. The two bodies 210, 220 are respectively connected to the two brackets 123 of each carrying assembly 120. Each bracket 123 is adapted to rotate along with each corresponding rotation shaft 122 and rotate relative to the torque element 121 to drive the two bodies 210, 220 to expand or close relative to each other.

Figure 3B:
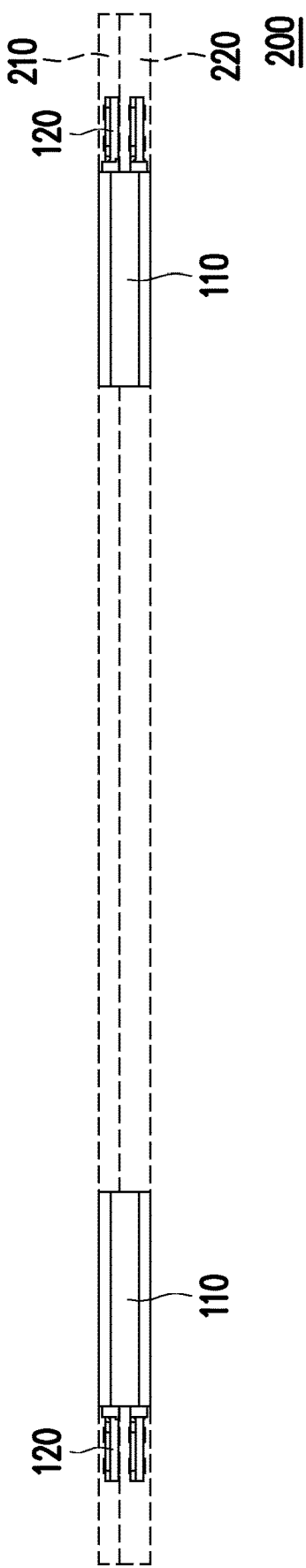
FIG. 3B through FIG. 3E are schematic structural diagrams illustrating the electronic device depicted in FIG. 2A using two, four, three and three carrying assemblies.

Referring again to FIG. 3B, in the present embodiment, each hinge module 100 includes only one carrying assembly 120. Thus, the two bodies 210, 220 have only two carrying assemblies 120 connected between each other and thus, have a minimum torque. In the implementation scenario as illustrated in FIG. 3B, the two bodies 210, 220 are adapted to use specifications for a thin and light type.

Figure 3C:
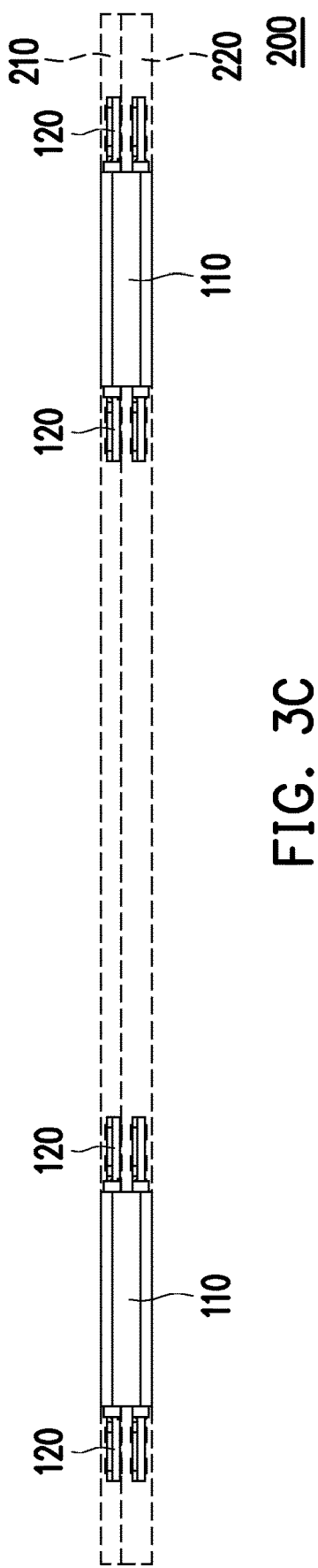

Referring to FIG. 3C, in the present embodiment, the number of the carrying assemblies 120 of each hinge module 100 is two. The two carrying assemblies 120 are respectively disposed in the two accommodation spaces AS of each housing 110. Thus, the two bodies 210, 220 have four carrying assemblies 120 connected between each other and thus, have a maximum torque. In the implementation scenario as illustrated in FIG. 3C, the two bodies 210, 220 are adapted to use specifications for a thick and heavy type.

Figure 3D:
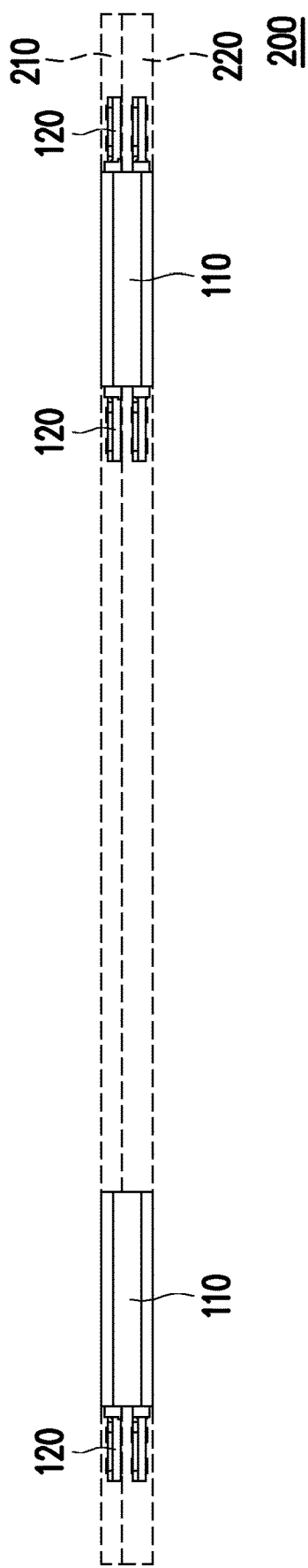

Referring to FIG. 3D, in this implementation scenario, the number of the carrying assemblies 120 of one of the hinge modules 100 is two (at the right side of the electronic device 200), and the number of the carrying assemblies 120 of the other one of the hinge modules 100 is one (at the left side of the electronic device 200). In the structure scenario as illustrated in FIG. 3D, a weight of the left side of the two bodies 210, 220 is greater than that of the right side, the two bodies 210, 220 may achieve force balance through the unequal numbers of the carrying assemblies 120 at the left and the right sides when the two bodies 210, 220 are expanded or closed.

Figure 3E:
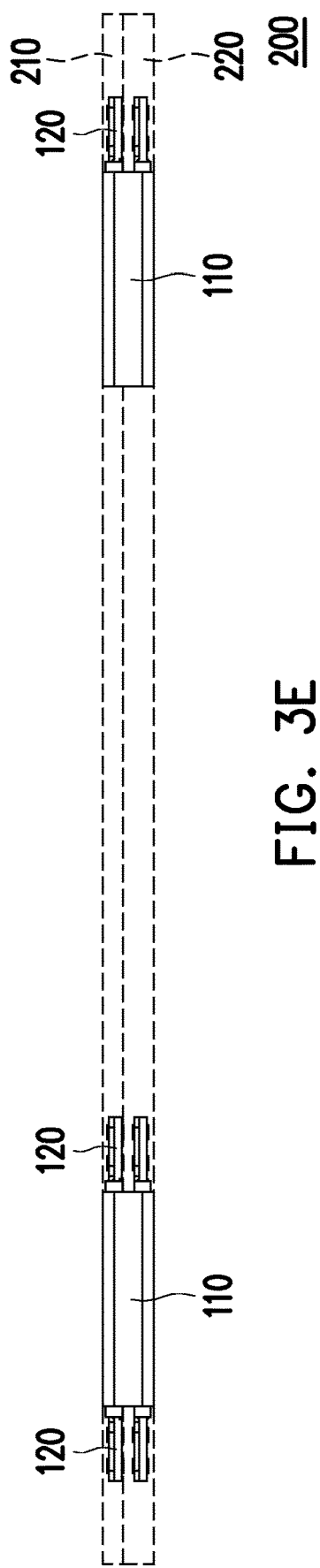

Referring to FIG. 3E, in this implementation scenario, the number of the carrying assemblies 120 of one of the hinge modules 100 is two (at the left side of the electronic device 200), and the number of the carrying assemblies 120 of the other one of the hinge modules 100 is one (at the right side of the electronic device 200). In the structure scenario as illustrated in FIG. 3E, the weight of the right side of the two bodies 210, 220 is greater than that of the left side, the two bodies 210, 220 may achieve force balance through the unequal numbers of the carrying assemblies 120 at the left and the right sides when the two bodies 210, 220 are expanded or closed.

Figure 4A:
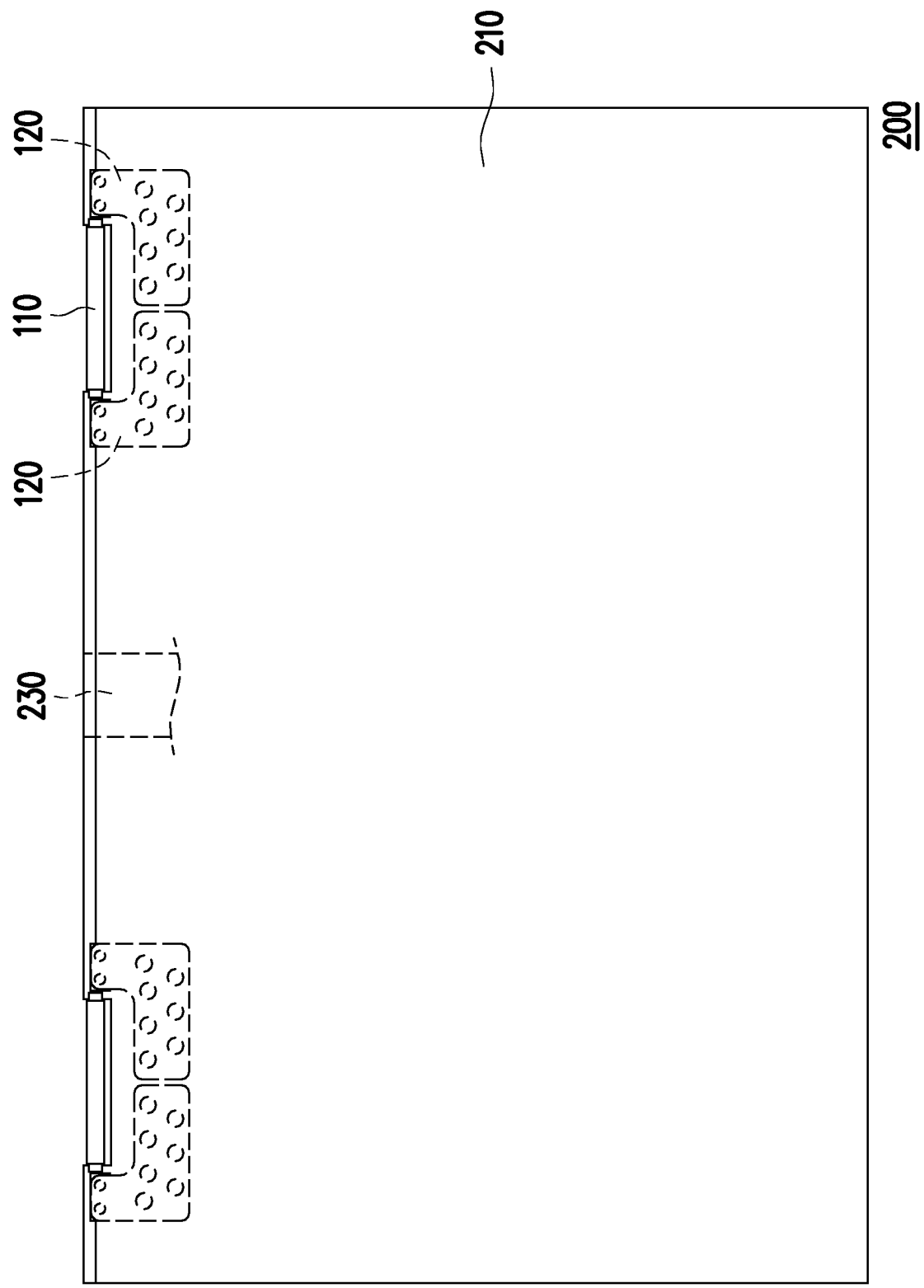
FIG. 4A is a schematic wiring diagram of the electronic device depicted in FIG. 3C.

FIG. 4A is a schematic wiring diagram of the electronic device depicted in FIG. 3C. Referring to FIG. 4A and FIG. 3C, in the present embodiment, the electronic device 200 further includes a bus cable 230 disposed in the two bodies 210, 220 and located between the two hinge modules 100. The bus cable 230 is electrically coupled to the two bodies 210, 220 and used for transmitting electric signals. For example, an image signal from the host end is transmitted to the display end through the bus cable 230, and then, a color image is output by the display end.

Figure 4B:
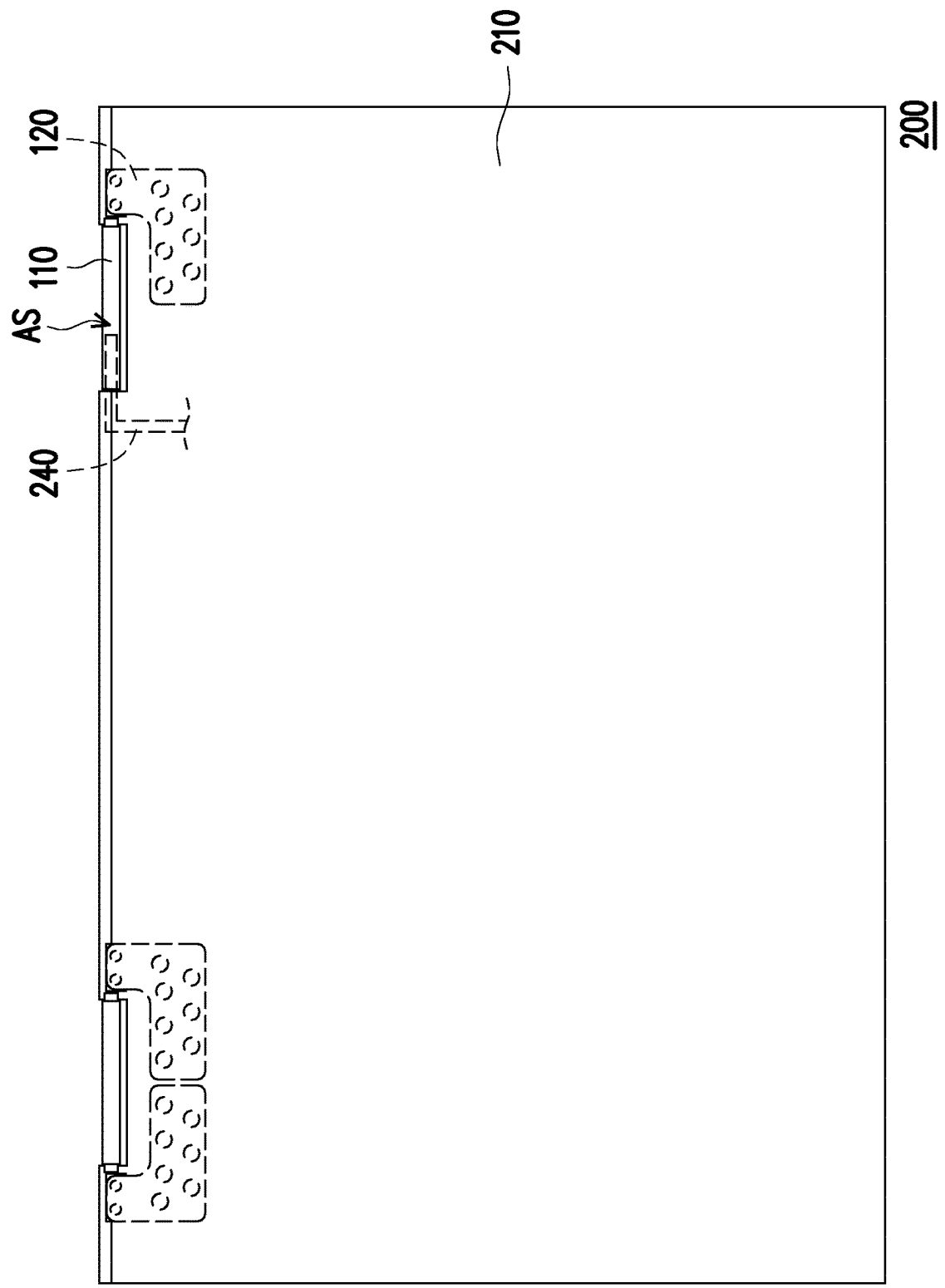
FIG. 4B is a schematic wiring diagram of the electronic device depicted in FIG. 3E.

FIG. 4B is a schematic wiring diagram of the electronic device depicted in FIG. 3E. Referring to FIG. 4B and FIG. 3E, in the present embodiment, the electronic device 200 further includes a cable 240 disposed in the two bodies 210, 220 and adjacent to the aforementioned other one of the hinge modules 100 which is located at the right side of the electronic device 200. The cable 240 is partially disposed in the other one of the accommodation spaces AS of the housing 110 in which no carrying assembly 120 is disposed. The cable 240 is electrically coupled to the two bodies 210, 220 and used for transmitting electric signals. For example, an image signal of the host end is transmitted to the display end through the cable 240, and then, a color image is output by the display end. Furthermore, the cable 240 is accommodated in the accommodation space AS, such that the two bodies 210, 220 may be additionally disposed with other electronic components, or an additional room may be released in favor for improving a heat dissipation effect.

In light of the foregoing, the hinge module of the invention is adapted to connect the two bodies, and the housing includes the two accommodation spaces which are separated from each other for a carrying assembly to be disposed in each accommodation space. When the hinge module is disposed to include a single carrying assembly, the value of the torque applied between the two bodies by the hinge module is smaller, so as to easily expand or close the two bodies relative to each other, which is applicable to thin and light bodies. When the hinge module is disposed to include two carrying assemblies, the value of the torque applied between the two bodies by the hinge module is larger, which is applicable to thick and heavy bodies. Accordingly, a designer can correspondingly adjust the number of the carrying assemblies required by the hinge module according to characteristics and torque demands of the two bodies. In addition, the hinge module of the invention can satisfy standard torque demands through the disposition of the two carrying assemblies, as well as achieve an effect of reducing an overall thickness of the hinge module at the same time.

Furthermore, the electronic apparatus of the invention is connected to the two hinge modules and can be adjusted to various usage scenarios that two, three and four carrying assemblies are used according to the torque demands, thereby satisfying the optimal torque value required by the electronic device, so as to achieve force balance when the electronic device is expanded or closed. In addition, according to various usage aspects, the bus cable or the cable can also be used between the two bodies of the electronic device to achieve flexible wiring for the electronic device, which is favorable for saving the inner space of the bodies.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A hinge module, comprising:
   a housing, having two accommodation spaces; and
   two carrying assemblies, respectively disposed in the two accommodation spaces of the housing and each of the two carrying assemblies comprising:
   a torque element, disposed in one of the accommodation spaces;
   two rotation shafts, passing through the torque element; and
   two brackets, respectively connected to the two rotation shafts and located outside the housing,
   wherein each of the brackets is adapted to rotate along with the corresponding rotation shaft and rotates relative to the torque element.

2. The hinge module as claimed in claim 1, wherein an engagement bevel surface is formed in each of the accommodation spaces, and the at least one carrying assembly and the corresponding engagement bevel surface tightly fit with each other.

3. The hinge module as claimed in claim 1, wherein a fixing structure is formed in each of the accommodation spaces, and the at least one carrying assembly and the corresponding fixing structure tightly fit with each other.

4. The hinge module as claimed in claim 1, further comprising a positioning pillar, disposed in the housing, and two end portions of the positioning pillar respectively extending into the two accommodation spaces.

5. The hinge module as claimed in claim 4, wherein the at least one carrying assembly comprises a positioning plate sleeved on the two rotation shafts and accommodating one of the end portions of the positioning pillar.

6. The hinge module as claimed in claim 1, wherein the at least one carrying assembly comprises a position-limiting plate sleeved on the two rotation shafts and having a first stopper and a second stopper, each of the rotation shafts has a bump, when the two brackets are closed relative to each other, the two bumps respectively abut against the first stopper and the second stopper, and when the two brackets are expanded relative to each other, the two bumps respectively depart away from the first stopper and the second stopper.

7. The hinge module as claimed in claim 1, wherein two openings of the two accommodation spaces are respectively formed at two opposite sides of the housing.

8. An electronic apparatus, comprising:
two bodies; and
two hinge modules, disposed between the two bodies, and each of the hinge modules comprising:
a housing, having two accommodation spaces; and
two carrying assemblies, respectively disposed in the two accommodation spaces of the housing and each of the two carrying assemblies comprising:
a torque element, disposed in one of the accommodation spaces;
two rotation shafts, passing through the torque element; and
two brackets, respectively connected to the two rotation shafts and located outside the housing, wherein the two bodies are respectively connected to the two brackets,
wherein each of the brackets is adapted to rotate along with the corresponding rotation shaft and rotate relative to the torque element to drive the two bodies to expand or close relative to each other.

9. The electronic device as claimed in claim 8, further comprising a bus cable, disposed in the two bodies and located between the two hinge modules.

10. The electronic device as claimed in claim 8, wherein the number of the at least one carrying assembly of one of the hinge modules is two, and the two carrying assemblies are respectively disposed in the two accommodation spaces of the housing, wherein the number of the at least one carrying assembly of the other one of the hinge modules is one, and the carrying assembly is disposed in one of the accommodation spaces of the housing.

11. The electronic device as claimed in claim 10, further comprising a cable, disposed in the two bodies and located adjacent to the other one of the two hinge modules, and the cable being partially disposed in the other one of the accommodation spaces of the housing.

12. The electronic device as claimed in claim 8, wherein an engagement bevel surface is formed in each of the accommodation spaces, and an interference portion of the at least one carrying assembly and the corresponding engagement bevel surface tightly fitting with each other.

13. The electronic device as claimed in claim 8, wherein a fixing structure is formed in each of the accommodation spaces, and an interference portion of the at least one carrying assembly and the corresponding fixing structure tightly fitting with each other.

14. The electronic device as claimed in claim 8, further comprising two positioning pillars, respectively disposed in the two housings, and two end portions of each of the positioning pillars respectively extending into the corresponding two accommodation spaces.

15. The electronic device as claimed in claim 14, wherein the at least one carrying assembly comprises a positioning plate sleeved on the two rotation shafts and accommodating one of the end portions of the positioning pillars.

16. The electronic device as claimed in claim 8, wherein the at least one carrying assembly comprises a positioning plate sleeved on the two rotation shafts and having a first stopper and a second stopper, each of the rotation shafts has a bump, when the two brackets are closed relative to each other, the two bumps respectively abut against the first stopper and the second stopper, and when the two brackets are expanded relative to each other, the two bumps respectively depart away from the first stopper and the second stopper.

* * * * *